United States Patent [19]

Meier

[11] 4,378,702
[45] Apr. 5, 1983

[54] FLAT MEASURING STRING CONSTRUCTION

[75] Inventor: Eugene Meier, Meilen, Switzerland
[73] Assignee: Mettler Instrumente AG, Greifensee, Switzerland
[21] Appl. No.: 300,487
[22] Filed: Sep. 9, 1981

[30] Foreign Application Priority Data

Dec. 16, 1980 [CH] Switzerland .......................... 9253/80

[51] Int. Cl.$^3$ ............................................. G01N 3/08
[52] U.S. Cl. ................................. 73/826; 73/DIG. 1
[58] Field of Search ............. 73/826, 862.59, DIG. 1, 73/810, 830, 1 DV, 580, 778, 517 AV, 204, 581; 331/156

[56] References Cited

U.S. PATENT DOCUMENTS 3,411,347 11/1968 Wirth et al. ............................ 73/141
3,701,392 10/1972 Wirth et al. ........................ 177/210
3,779,072 12/1973 Meier ................................ 13/141 R Primary Examiner—E. R. Kazenske
Assistant Examiner—David R. Schuster
Attorney, Agent, or Firm—Laubscher, Philpitt & Laubscher

[57] ABSTRACT

A flat measuring string is disclosed that is formed from a blank of sheet metal (such as a niobium-zirconium alloy), characterized by the provision of bendable or foldable wing flaps arranged at the nodal portions of the string, thereby to permit the connection of nodal masses to the string. In this manner, it is possible to achieve good measurement-technical data, especially, data regarding hysteresis and creepage under load, coupled with extensive freedom in the choice of materials and very economical mass production of the string components. The measuring string is particularly suitable for use in force or distance measurement.

8 Claims, 9 Drawing Figures

FLAT MEASURING STRING CONSTRUCTION

BRIEF DESCRIPTION OF THE PRIOR ART

This invention relates to a flat measuring string with two nodal portions, such as, for example, a string used in instruments for measuring distance or force. In the measuring process, lateral oscillations are generated having a frequency which depends on the load to be measured. These frequency changes then—if suitably utilized—serve to determine the particular load force acting upon the string (and from that one can possibly determine a distance or a length change).

Flat measurement strings are well known in the art, as evidenced, for example, by the U.S. Pat. to Wirth et al No. 3,411,347, and the German Offenlegungschrift No. 1,963,303, which disclose proposals for the design of string cross sections, as well as the connection between the string and the node and/or between the string and the suspension. Another publication (German Offenlegungschrift No. 2,226,142) discloses a string with a round cross section and with joints (generated, for example, by squeezing) between the string and the suspension which disconnect in keeping with the oscillations. The round string cross section as well as the nodes there had been processed by means of machining, especially grinding.

The disadvantage in this known string is that certain materials, which in themselves have properties advantageous especially for measurement strings (for example, niobium-zirconium alloys) are difficult to machine. Besides, machining methods regularly are more expensive than non-cutting methods, at any rate, when series production is involved.

SUMMARY OF THE INVENTION

A primary object of the present invention is to provide a flat measuring string that meets high requirements in terms of its measuring-technique properties (particularly only very little creepage under stress and a small hysteresis) and which nevertheless is produceable from a large number of materials, whereby the manufacturing method in particular is suitable for mass series production. According to the present invention, this problem is solved by providing the string with wing flaps which form node portions and which are integrally formed by means of punch-bending technique. This solution furthermore combines the advantage of a single-piece string with a manufacturing method which is highly economical in terms of material savings, that is to say, expensive materials can also be used without significantly influencing the production costs. In this way, for example, it is also possible to use as the string material alloys from the family of metallic glasses (amorhous metals) which are particularly suitable for measuring strings, for example, because of their favorable temperature performance.

When the mass or weight ratios between the string and the node portions so require, the node portions may be provided with additionally applied masses. In one particular version, the additional node masses are U-shaped and are so connected with corresponding U-shaped node portions so that the total center of gravity will lie along the center line of the string. Alternately, the additional node masses include a hollow profile for connection with the node portions by means of point welding or gluing.

A further reduction of the hysteresis can be achieved if the measuring string does not reveal any punching edges. To this end, removal of the edges after punching can be accomplished in a simple manner by etching away. This step is particularly practical for measuring cords that must meet higher requirements in terms of result resolution.

In a further embodiment of the invention, it is possible to provide suspension members made of synthetic plastic material arranged between the nodes and the string ends. This facilitates a simple connection—electrically insulated from the other parts of the equipment—of electrical conductors to the string ends outside the regions that are stressed in terms of force. The suspension members here can be formed by molding or spraying around the ends of the string. Here it is particularly advantageous if the string ends in the area of the suspension members each contain an attachment hole that is formed to provide a flanged edge. This design brings about an improvement in the shifting resistance of the suspension members under load and it thus also makes for better creepage behavior.

In order further to improve the oscillation quality of the string, the string can include tapered sections, thereby to improve the isolation of the oscillating string from the environment.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
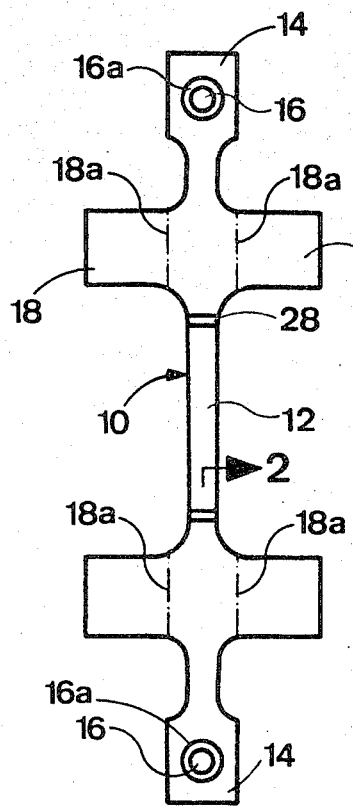
FIG. 1 is a plan view of the sheet metal blank from which the measuring string of the present invention is formed.
Figure 2:
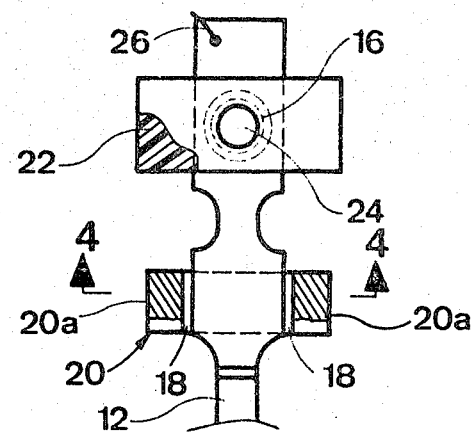
FIG. 2 is a detailed sectional view taken along line 2—2 of FIG. 1.

The measuring string of the present invention is formed from a blank 10 (FIGS. 1 and 2) punched from a metal sheet (such as a sheet formed from a niobium-zirconium alloy having a thickness of about 0.1 mm). The punching ridges or edges are removed by treatment with an etching solution, as is known in the art.

The measuring string 12 includes a pair of end portions 14 containing punched apertures 16 having annular flange portions 16a, and two pairs of attaching wing flaps 18 formed at the string nodal points. The wing flaps are bent along the fold lines 18a, as will be described in greater detail below. A pair of impressed constrictions 28 are provided adjacent the ends of the string portion 12 for reducing bending resistance.

Figure 3:
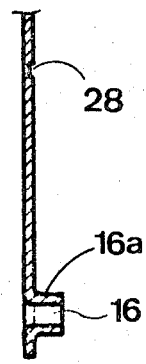
FIG. 3 is a detailed view of the upper end portion of the measuring string with the nodal weight and with the suspension member attached thereto.
Figure 4:
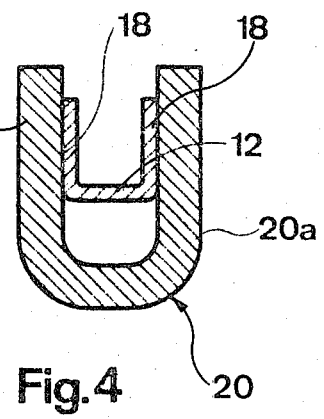
FIG. 4 is a sectional view taken along line 4—4 of FIG. 3.

Referring now to FIG. 3, at its upper end the string blank is connected between the leg portions 20a of a rigid U-shaped node calibrating inertia mass 20 by bending the wing flaps 18 about fold lines 18a to positions normal to the blank, whereupon the blank is inserted within, and is resiliently retained between, the mass legs portions 20a, as shown in FIG. 4. Similarly, the lower end of the string is connected by the lower pair of flaps with a similar U-shaped mass (not shown). The U-shaped mass is preferably formed of metal, such as brass, the arrangement of FIG. 4 being such that the total center of gravity of the center of the connection 18 and the additional mass 20 lies precisely along the center line of the measuring string 12. A coupling or suspension member 22, formed of synthetic plastic material, is connected with the upper end of the string blank (by molding or spraying, for example). Bore hole 24 is formed in the suspension member 22 opposite the aperture 16, the bore hold 24 having a smaller diameter than that of the aperture. The bore hole 24 is adapted to receive an attachment screw (not shown) for securing the string to a fixed support. Conductive lead 26 is soldered to the upper extremity of the string for connecting the same with an electrical circuit (not shown).

Figure 5:
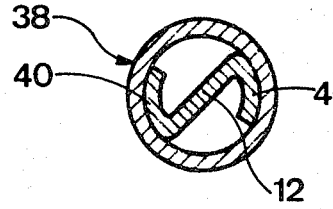
FIGS. 5-9 are sectional views illustrating various wing flap connections with the nodal weights.

In the modification of FIG. 5, the wing flaps 32 have terminal portions 32a that are bent orthogonally to positions in engagement with the end surfaces of the leg portions 30a of the U-shaped mass 30.

Figure 6:
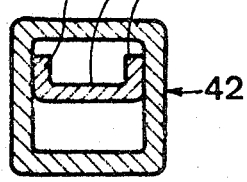

In the embodiment of FIG. 6, the nodal mass 38 is annular, the wing flaps 40 being bent in opposite directions into curved configurations corresponding with the inner surface of mass.

Figure 7:
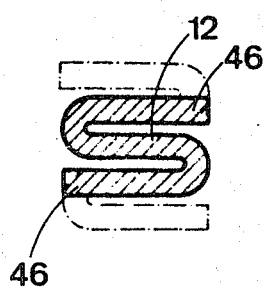
Figure 8:
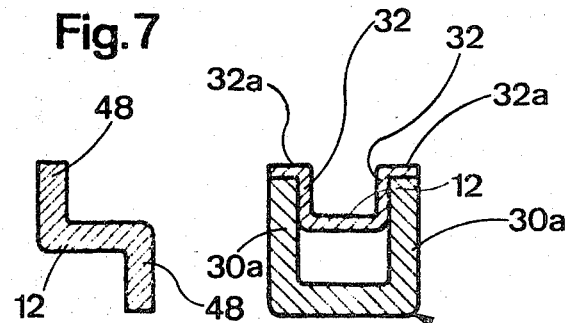

In the embodiment of FIG. 7, the mass 42 has a hollow square-shaped cross sectional configuration, the wing flaps 44 being bent orthogonally toward positions in resilient engagement with the inner surface of the mass. In FIG. 8, the wing flaps 46 are folded to provide an S-shaped configuration. As shown in phantom, further folding of longer wing flaps would produce a serpentine configuration for generating greater nodal masses.

Figure 9:
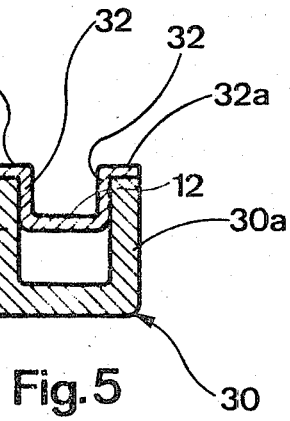

In FIG. 9, the wing flaps 48 are bent orthogonally in opposite directions, which configuration has utility in those installations in which the factors of inertia and stiffness are more important than the stability of oscillations (i.e., with equipment having a relatively low degree of accuracy).

While in accordance with the Patent Statutes the preferred forms and embodiments have been illustrated and described, other improvements and modifications might be made without deviating from the inventive concepts set forth above.

What is claimed is:

1. A flat measuring string, comprising
   a unitary body member formed by punching from a metal sheet, said body member including
   (a) a flat planar central main string portion (12);
   (b) a pair of flat end portions (14) arranged at the ends of said main string portion, respectively; and
   (c) a pair of nodal portions arranged between said main string portion and said end portions, respectively, each of said nodal portions including a flat center portion coplanar with said main string portion and of flat, integral wing portions (18) folded with respect to said center portion about parallel fold lines (18a), respectively.

2. Apparatus as defined in claim 1, and further including a pair of additional mass members mounted at said nodal portions, respectively.

3. Apparatus as defined in claim 2, wherein each of said additional mass members (20) has a U-shaped configuration defining a pair of horizontally spaced leg portions (20a), said wing portions being folded about said fold lines in the same direction to said string to define a U-shaped configuration corresponding to that of said additional mass, said wing portions being retained between said leg portions to cause the center of gravity of the nodal connection of said additional mass and said wing portions to lie along the center line of said string.

4. Apparatus as defined in claim 2, wherein each of said additional mass members has a hollow cross sectional configuration for receiving the folded wing portions of said string, thereby to retain said additional masses at nodal locations on said string body member.

5. Apparatus as defined in claim 1, wherein said body member is etched to remove any residual edges formed during the punching operation.

6. Apparatus as defined in claim 1, and further including between each pair of said wing portions and the adjacent end portion a suspension member (22) formed of synthetic plastic material.

7. Apparatus as defined in claim 6, wherein each of said string end portions contains an attaching aperture (16) having an annular flange portion (16a).

8. Apparatus as defined in claim 1, wherein said string body member contains between each end of the flat main string portion and the associated wing flap nodal portion a compressed portion (28).

* * * * *